May 22, 1934. K. DROEGE 1,959,947
COPYING PROCESS FOR ZINCOGRAPHY
Filed Jan. 14, 1932
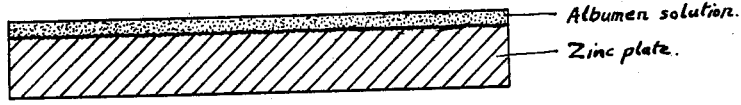
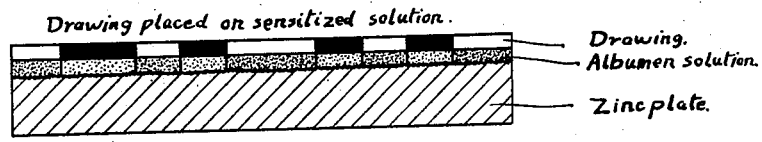
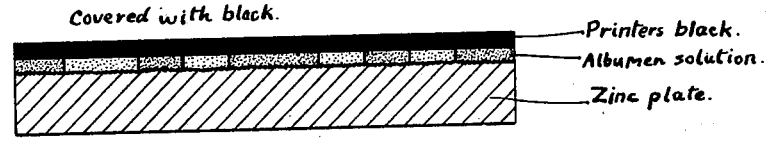
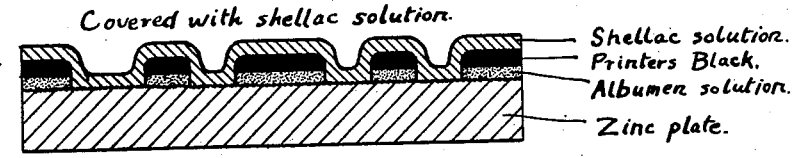
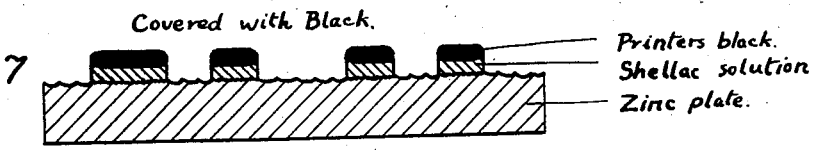
INVENTOR:
Karl DROEGE.
By, Chatwin & Company. Attys Patented May 22, 1934

1,959,947

UNITED STATES PATENT OFFICE 1,959,947

COPYING PROCESS FOR ZINCOGRAPHY

Karl Droege, Frankfort-on-the-Main, Germany

Application January 14, 1932, Serial No. 586,711

3 Claims. (Cl. 95—5.7)

The invention relates to the preparation of zinc plates or forms ready for use in zincographic printing or copying.

The above process is essentially suitable for the reproduction of technical drawings or the like and the essential advantage appertaining to the same lies in the fact that the drawing or copy of the drawing produced by the process hereinafter described on a zinc plate is very durable and lasting so that damage to the plate in the treatment or handling thereof does not easily occur or give rise to waste or scrapping thereof as is usually the case; then again another advantage of the process hereinafter described lies in the fact that the substances or chemicals required to produce a zinc plate ready for use in printing are inexpensive.

The seven figures of the accompanying drawing show the plate at various stages of the process, and each stage is suitably indicated upon the drawing by appropriate briefing.

When carrying this process into effect, the plates customarily used when printing off zinc (zincography) are vary fully grained, i. e. straight grained or frosted by means of a grinding machine in the well known manner so as to give a grip or key to the shellac coating applied subsequently so as to cause said shellac coating to adhere thoroughly to the zinc plate.

The plate is then as is well known thoroughly deoxidized for which purpose glacial acetic acid, diluted with water in the proportion of 1 part acid to 20 parts water is generally used.

The plate is thoroughly rinsed and after the water or washing medium has been allowed to drip off a light sensitive solution, which is also in its total composition known per se, is poured on the plate while it is still in a moist state.

This light sensitive solution is composed of the following ingredients, viz:—

| | |
|---|---|
| Pure albumen | 100 grams |
| Ammonium bichromate | 25 do. |
| Glue | 20 do. |
| Water | 2250 ccm. |

The glue is dissolved in a part of the water having been made warm and the other ingredients are dissolved in the remaining quantity of water.

The two solutions thus obtained are then thoroughly stirred and mixed together and the whole mixture is then twice passed through a filter and before application to the zinc plates.

A suitable quantity of the solution is poured onto the zinc plate and is uniformly and evenly distributed over it in the known manner by means of a centrifugal device and the plate is then dried over a flame at a moderate heat or temperature and the plate, which is now duly sensitized, is stored in such manner as to exclude all access of light. The plate sensitized in the above manner is illustrated in Figure 1 of the accompanying drawing.

When it is desired to copy a drawing or tracing, for instance, the same is laid upon the sensitized plate, and is exposed to the action of light preferably in a pneumatic copying frame. The time of exposure is in the case of drawings executed in Chinese ink on tracing paper or linen approximately from 2 to 3 minutes and the above process is well known and in the present invention is first employed.

Now, according to the present invention the photo thus obtained is treated with a developing colour or solution consisting of 1 part of printer's black dissolved in 4 parts of oil of turpentine. The black is rubbed onto the photo and is evenly and uniformly spread and distributed by means of a gelatine or like covered roller this being kept up until the oil of turpentine has completely evaporated which leaves a layer of black as shown in Figure 2. This is necessary so as to give the covering colour a sufficient strength and firmness so that it shall not blotch or smear during the subsequent treatment.

The zinc plate thus prepared is now for the purpose of developing the photo immersed or laid in a trough or tank containing pure and clean water and is then rubbed over with a wad of cotton wool until the drawing appears in metal on a black background as shown in Fig. 4.

For the purpose of any possible tendency that might occur to smear or wipe off or blur the covering colour a few drops of ammonia or a little quantity of a soda solution may be added to the developing water. These substances also serve the purpose of correctly developing over exposed plates.

Now the drawing at present appears as a negative on the zinc plate. To transform this into a positive, the plate is wiped over and rapidly dried as shown in Fig. 5. A solution is thinly and evenly distributed over the plate said solution consisting of the following ingredients, viz:

| | |
|---|---|
| Shellac | 140 grams |
| Colophonium | 10 do. |
| Methyl violet | 10 do. |
| Denaturized Alcohol II | 2500 ccm. |

The shellac gives the drawing a base or backing possessing a strength and firmness which cannot be attained by any other process.

The plate, over which the above solution has been applied, is then dried over a flame or otherwise at a moderate temperature and the plate is then washed with ordinary paraffin such as is used for fuel in paraffin lamps, a soft brush being used in so doing, until the covering or coating, that is the shellac and printer's black, has been completely dissolved and removed from the unexposed parts of the plate. After cleaning the plate by means of a wet wiping rag, a solution of gum arabic in water is rubbed over the same until all traces of oil or fat are thoroughly eliminated from such parts of the plate not covered by the drawing, that is to say, until the gum solution is no more repelled.

Thereupon these plates are rinsed with water and the drawing now appears as a positive as shown in Fig. 6 which positive is formed by the shellac layer adhering to the plate.

After this part of the process is finished any necessary retouching of the drawing may be effected in the usual manner by any known method, by means of a pumice stone pencil or knife and restoring broken lines by means of lithographic ink.

Then the plate is etched by means of nitric acid which is diluted in a proportion of 1 to 5 and is applied by means of felt balls or wads, so as to remove the albumen layer or film from the plate which is then rinsed and is finally subjected to a finishing corrosive action so as to thoroughly cleanse it by treatment with sulphuric acid diluted in a proportion of 1 to 15. After the plate has again been thoroughly rinsed, the background, which is necessary to be able to use the same for printing, is created by treating the plate with the following solution, namely:—

|  | Ccm. |
|---|---|
| Nitric acid | 200 |
| Hydrochloric acid | 200 |
| Phosphoric acid | 200 |
| Sodium bichromate | 120 |
| Water | 5000 |

The plate is now ready for inking and is used in the usual manner.

I claim:—

1. A zincographic copying process including a light sensitive film consisting of an albumen-bichromate solution, rubbing over the exposed plate with a solution of printer's black in oil of turpentine until said plate becomes dry and then treating the plate with a weak solution of water and ammonia to develop the plate as a negative.

2. A zincographic copying process wherein an albumen-bichromate solution is used as a light sensitive film consisting in rubbing over the exposed plate with a solution of printer's black in oil of turpentine until said plate is dry, washing the plate with a solution of ammonia and water, rubbing the plate where the drawing appears with a solution of shellac, then washing the plate with paraffin and then applying an aqueous solution of gum arabic to the plate to free the sam from fat.

3. A zincographic copying process wherein an albumen-bichromate solution is used as a light sensitive film, consisting in rubbing over the exposed plate with a solution of printer's black in oil of turpentine until said plate becomes dry, washing the plate with a solution of ammonia and water, applying to the plate where the drawing appears a solution of shellac, washing the plate with paraffin, applying to the plate an aqueous solution of gum arabic to free the plate from fat, etching the plate with dilute nitric acid, cleaning the plate with dilute sulphuric acid and corroding the plate with an acid bichromate solution to accentuate the etched surface, the plate being rinsed after each operation.

KARL DROEGE.